(12) United States Patent
Nordbruch

(10) Patent No.: US 10,274,967 B2
(45) Date of Patent: Apr. 30, 2019

(54) METHOD FOR LOADING A VEHICLE

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 59 days.

(21) Appl. No.: 15/515,944

(22) PCT Filed: Oct. 22, 2015

(86) PCT No.: PCT/EP2015/074461
§ 371 (c)(1),
(2) Date: Mar. 30, 2017

(87) PCT Pub. No.: WO2016/083033
PCT Pub. Date: Jun. 2, 2016

(65) Prior Publication Data
US 2017/0300063 A1 Oct. 19, 2017

(30) Foreign Application Priority Data

Nov. 26, 2014 (DE) .................. 10 2014 224 092

(51) Int. Cl.
G05D 1/02 (2006.01)
(52) U.S. Cl.
CPC ... *G05D 1/0274* (2013.01); *G05D 2201/0216* (2013.01)
(58) Field of Classification Search
CPC .................................................. G05D 1/0274
See application file for complete search history.

(56) References Cited

U.S. PATENT DOCUMENTS

| 5,775,227 | A | * | 7/1998 | Mullen | B30B 15/304 |
| | | | | | 104/244 |
| 7,991,505 | B2 | * | 8/2011 | Lert, Jr. | B65G 1/0492 |
| | | | | | 198/347.1 |
| 9,725,241 | B2 | * | 8/2017 | Swinkels | B66F 9/063 |
| 9,738,206 | B2 | * | 8/2017 | Scheer | B60P 1/483 |
| 2004/0112660 | A1 | | 6/2004 | Johansson et al. | |
| 2008/0027599 | A1 | | 1/2008 | Logan et al. | |
| 2008/0243378 | A1 | * | 10/2008 | Zavoli | G01C 21/28 |
| | | | | | 701/533 |

(Continued)

FOREIGN PATENT DOCUMENTS

| DE | 102009028024 A1 | 2/2011 |
| DE | 102010032876 A1 | 2/2012 |

(Continued)

OTHER PUBLICATIONS

International Search Report dated Jan. 12, 2016, of the corresponding International Application PCT/EP2015/074461 filed Oct. 22, 2015.

*Primary Examiner* — Hussein Elchanti
*Assistant Examiner* — Michael A Berns
(74) *Attorney, Agent, or Firm* — Norton Rose Fulbright US LLP; Gerard Messina

(57) ABSTRACT

A method for loading a vehicle, wherein, based on a digital loading station map of a loading station and a digital transport vehicle map of a transport vehicle, the vehicle drives autonomously from the loading station onto the transport vehicle or vice versa. A loading management system, a loading station, and a computer program are also described.

13 Claims, 1 Drawing Sheet

(56) References Cited

U.S. PATENT DOCUMENTS

2012/0188100 A1*  7/2012  Min .................. G08G 1/143
                                              340/932.2
2018/0012519 A1*  1/2018  Nordbruch ............ G01C 21/32

FOREIGN PATENT DOCUMENTS

| DE | 102012016519 A1 | 2/2014 |
| DE | 102012222562 A1 | 6/2014 |
| EP | 1480097 A2 | 11/2004 |
| WO | 2013050194 A1 | 4/2013 |

* cited by examiner

METHOD FOR LOADING A VEHICLE

FIELD

The present invention relates to a method for loading a vehicle. The present invention also relates to a loading management system as well as to a computer program.

BACKGROUND INFORMATION

German Patent Application No. DE 10 2012 222 562 A1 describes a system for managed parking areas for transporting a vehicle from a starting position to a destination position.

In fully automated (autonomous) so-called valet parking, a vehicle is parked by its driver at a drop-off point, for example in front of a parking garage, and from there the vehicle drives autonomously into a parking position/parking space and again back to the transfer point.

When loading vehicles in ships, on trains, on trucks and in airplanes from or, respectively, to parking lots and transfer/retrieval points, vehicles are driven by human personnel.

This may be inefficient. Furthermore, driving by human personnel may also be time-consuming. Moreover, the human personnel are unable to take on other tasks during this time.

SUMMARY

An object of the present invention is to provide for an efficient loading of a vehicle (or multiple vehicles).

This object may be attained by the embodiments of the present invention. Advantageous embodiments of the present invention are described herein.

According to one aspect, a method for loading a vehicle (or several, the plural shall always be included) is provided, wherein, based on a digital loading station map of a loading station and a digital transport vehicle map of a transport vehicle, the vehicle drives autonomously from the loading station onto the transport vehicle or vice versa.

According to one aspect, a loading system for loading one or multiple vehicle is provided, which comprises a loading station as well as the loading management system.

According to yet another aspect, a loading management system for managing and coordinating a loading of vehicles is provided, the loading management system being designed to plan and/or coordinate and/or support an autonomous travel of a vehicle from a transport vehicle to a loading station or vice versa.

According to another aspect, a computer program is provided, which includes program code for executing the method for loading a vehicle when the computer program is run on a computer.

The present invention thus comprises in particular the idea that now it is no longer human personnel that drive the vehicle onto a transport vehicle or from a transport vehicle. Instead, the present invention provides for the vehicle to drive autonomously from the loading station onto the transport airplane or vice versa.

This is made possible in particular by the fact that a digital loading station map of the loading station and a digital transport vehicle map of the transport vehicle are provided. Based on these digital maps, the vehicle is able to drive or navigate autonomously. This advantageously provides for an efficient loading of the vehicle. The human personnel are able to assume other tasks during this time. Normally, it is possible to perform an autonomous drive of the vehicle in a less time-consuming manner than a drive by human personnel. For human personnel, for instance, must enter the vehicle and exit the vehicle again. This takes time.

Autonomous in the sense of the present invention means in particular that the vehicle navigates or drives or is guided independently, that is, without an intervention of a driver. The vehicle thus drives independently, without a driver for this purpose having to control the vehicle or having to be present in the vehicle. A guidance comprises in particular a lateral and/or longitudinal guidance of the vehicle. The vehicle is preferably designed to park and/or unpark autonomously. For example, the vehicle has a parking assist. Such an autonomously driving vehicle, which is able to park and unpark automatically, is called an AVP vehicle, for example. AVP stands for "automatic valet parking" and may be translated as "automatic parking process". Vehicles that do not have this AVP functionality are called normal vehicles, for example. A manually guided vehicle may be a normal vehicle, for example. The vehicle is in one specific embodiment an AVP vehicle.

According to one specific embodiment, multiple vehicles are loaded.

Loading comprises loading and/or unloading. That is to say that the vehicle is loaded onto the transport vehicle. That is to say, for example, that the vehicle is unloaded from the transport vehicle. In the case of multiple vehicles, the present invention provides for example for the fact that some of the vehicles are loaded, while other vehicles are unloaded.

Another specific embodiment provides for a destination position on the transport vehicle or on the loading station, at which the vehicle is to park autonomously, to be chosen as a function of at least one vehicle parameter. This yields in particular the technical advantage that the destination position may be chosen optionally and efficiently for the vehicle. For due to the parameterization, it is possible to select an optimally suitable destination position for the vehicle. Thus, it is possible to take vehicle-specific characteristics into account for the destination position. For not every vehicle is able to be parked equally well at every parking position or destination position. A bus requires more space than a subcompact car.

Another specific embodiment provides for multiple vehicle parameters to be provided, which are for example identical or in particular different.

Yet another specific embodiment provides for the at least one vehicle parameter to be an element selected from the following group of vehicle parameters: dimensions of the vehicle, functional range of at least one driver assistance system of the vehicle, range of driving maneuvers the vehicle is able to perform in an autonomous operating mode.

Because it is possible to take into account the dimensions of the vehicle, it is possible to ascertain a destination position that has sufficient space for this vehicle to park safely. Dimensions include in particular a length and/or a width and/or a height.

The fact that a functional range of at least one (or multiple) driver assistance systems of the vehicle is taken into account in particular has the advantage of making it possible for the destination position to be optimally ascertained for a concretely existing driver assistance system of the vehicle. For, depending on the quality of the driver assistance system installed in the vehicle, it is possible for example that the vehicle is able to reach destination positions that are out of reach for vehicles that have a driver assistance system of a lesser quality with regard to its functional range.

The functional range comprises for example a sensor range and/or a sensor sensitivity of a surround sensor of a surround sensor system of the vehicle. Since a driver assistance system normally uses relevant surround sensor data for performing a driver assistance function, a functional range of the driver assistance system depends in particular also on a functional range of a surround sensor system, that is, in particular on a sensor range and/or a sensor sensitivity.

A surround sensor is for example an ultrasonic sensor, a lidar sensor, a radar sensor, a laser sensor or a video sensor. The surround sensor system preferably has multiple surround sensors.

Taking into account the range of driving maneuvers the vehicle is able to perform in an autonomous operating mode also has the technical advantage of being able to choose the destination position for the vehicle in an optimized manner. Thus, depending on the range of abilities, it is possible to select a destination position that can be reached only by driving a tight curve. Vehicles that are not able to drive such a tight curve in an autonomous driving mode will then not be assigned this destination position.

Another specific embodiment provides for ascertaining a rank of the vehicle in a loading sequence, which prescribes a sequence of loading vehicles, as a function of at least one of the following parameters: dimensions of the vehicle, functional range of at least one driver assistance system of the vehicle, range of driving maneuvers the vehicle is able to perform in an autonomous operating mode, dimensions of the transport vehicle.

Dimensions of the transport vehicle regarding one or more driving paths and/or parking spaces for the vehicles, dimensions of the loading station, dimensions of the loading station regarding one or more driving paths and/or parking spaces for the vehicles.

This has in particular the technical advantage of providing for an efficient coordination of a sequence of the vehicles to be loaded.

Another specific embodiment provides for the autonomous drive of the vehicle to be monitored and/or documented by a monitoring system external to the vehicle and/or a monitoring system internal to the vehicle.

This in particular has the technical advantage of making it possible to review the autonomous drive even after the termination of the autonomous drive. In particular, this makes it possible to detect and analyze errors that occurred during the autonomous drive. In particular, it is possible to recognize or detect errors already during the autonomous drive. These may then be remedied or solved directly. This makes it possible to avoid a delay when loading the vehicle.

Another specific embodiment provides for the monitoring by way of the monitoring system internal to the vehicle to include a monitoring and/or a documentation of data internal to the vehicle. This in particular has the technical advantage that errors or problems internal to the vehicle may be detected so that suitable countermeasures may be taken. This may also prevent a delay when loading the vehicle. In particular, the documentation has the advantage that even subsequently problems internal to the vehicle may still be detected and analyzed so that after an appropriate rectification these can in future no longer occur.

Data internal to the vehicle include for example data of a surround sensor system of the vehicle. According to one specific embodiment, a surround sensor system of the vehicle comprises one or multiple of the following surround sensors: laser sensor, lidar sensor, ultrasonic sensor, video sensor. Data internal to the vehicle include for example engine data, data of a sensor for detecting a steering wheel angle, brake sensor, transmission sensor. Data internal to the vehicle include for example planning data regarding planning of one or more trajectories, in particular the setpoint trajectory. Data internal to the vehicle include for example controller data and/or controller result data, that is, data concerning a controller result, that is, at what result a controller calculation has arrived, that is, what control action an actuator is to perform.

Another specific embodiment provides for securing a route that the vehicle travels during its autonomous drive. This in particular has the technical advantage of making it possible to reduce or even avoid a collision of the vehicle with additional vehicles and/or persons located within the route. For a mixed operation between an autonomously driving vehicle and a manually guided vehicle may include a risk of collision. For here situations may arise that are difficult to resolve. Such a situation is for example an unclear right-of-way situation, in which drivers of manually guided vehicles communicate by hand signals. This is normally not possible between a manually guided and an autonomously driving vehicle.

Another specific embodiment provides for the autonomous drive of the vehicle to be planned and/or coordinated and/or supported by one or more loading management systems external to the vehicle for managing and coordinating the loading of vehicles.

This yields in particular the technical advantage of making it possible to perform the loading process efficiently. For the vehicle is supported by one or more loading management systems external to the vehicle.

Thus one specific embodiment provides for the loading management systems to provide the digital maps to the vehicle. In particular, another specific embodiment provides for the loading management systems to transmit to the vehicle a destination position and in particular a setpoint trajectory to the destination position.

When the plural for "loading management system" is used, the singular is always to be included as well and vice versa. That is to say that according to a specific embodiment, only one loading management system external to the vehicle is provided. According to one specific embodiment, two loading management systems external to the vehicle are provided.

Another specific embodiment provides for coordinates of locations of the digital transport vehicle map to be adapted as a function of a current position of the transport vehicle relative to a reference coordinate system in coordinates of the reference coordinate system.

This yields in particular the technical advantage of taking into account that a transport vehicle moves so that different locations may result for loading and unloading vehicles. A digital transport vehicle map, however, normally only has internal coordinates for the individual locations, which do not take into account the different positions of the transport vehicle. That is to say that such a digital transport vehicle map is normally not universally usable in the world so that vehicles are able to drive autonomously onto the transport vehicle or out of the transport vehicle based on this digital transport vehicle map. These disadvantages may be overcome, however, in that one specific embodiment of the present invention provides for these coordinates to be adapted to coordinates of the reference coordinate system. For when this reference coordinate system is also a reference coordinate system for the vehicle, based on which the vehicle navigates or drives autonomously, then the vehicle, based on the digital transport vehicle map, is also able to drive autonomously on the transport vehicle.

Another specific embodiment provides for the reference coordinate system to be the world coordinate system.

One specific embodiment provides for the loading management system to be designed or developed to implement the method for loading a vehicle.

According to one specific embodiment, the monitoring system internal to the vehicle and/or external to the vehicle includes one or more video cameras and/or one or more radar sensors and/or one or more ultrasonic sensors and/or one or more lidar sensors and/or one or more laser sensors and/or one or more light barriers and/or one or more door opening sensors.

One specific embodiment provides for the transport vehicle to be a watercraft, in particular a ship, a rail vehicle, in particular a train, an aircraft, in particular an airplane or a helicopter, or a land vehicle, in particular a truck.

The transport vehicle in particular refers to a vehicle that is developed or designed for transporting one or multiple vehicles. The transport vehicle may be referred to as a transport vehicle for transporting one or multiple vehicles.

Functionalities and features regarding the method apply analogously to the loading management system and vice versa.

The present invention will be explained in greater detail below with reference to preferred exemplary embodiments.

DETAILED DESCRIPTION OF EXAMPLE EMBODIMENTS

Figure 1:
FIG. 1 shows a flow chart of a method for loading a vehicle.

FIG. 1 shows a flow chart of a method for loading a vehicle. A step 101 provides for the vehicle to drive autonomously from a loading station onto a transport vehicle or vice versa. This occurs on the basis of a digital loading station map of the loading station and a digital transport vehicle map of the transport vehicle.

Figure 2:
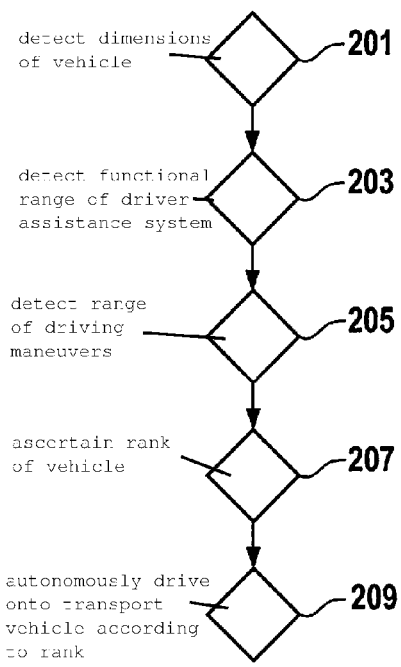
FIG. 2 shows a flow chart of another method for loading a vehicle.

FIG. 2 shows a flow chart of another method for loading a vehicle.

A step 201 provides for detecting dimensions of the vehicle. A step 203 provides for detecting a functional range of at least one driver assistance system of the vehicle.

A step 205 provides for detecting the range of driving maneuvers the vehicle is able to perform in an autonomous operating mode. Based on the data detected in accordance with steps 201, 203, 205, a step 207 provides for ascertaining a rank of the vehicle in a loading sequence, which prescribes a sequence of loading vehicles onto the transport vehicle or of unloading vehicles from the transport vehicle. In a step 209, the vehicle drives, in accordance with its rank in the loading sequence, autonomously onto the transport vehicle from the loading station or vice versa.

Figure 3:
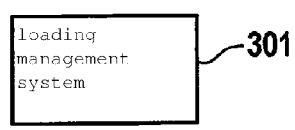
FIG. 3 shows a loading management system.

FIG. 3 shows a loading management system 301 for managing and coordinating the loading of vehicles, loading management system 301 being designed or developed to plan and/or coordinate and/or support an autonomous drive of a vehicle from a transport vehicle to a loading station or vice versa.

According to one specific embodiment, loading management system 301 comprises a monitoring system that is external to the vehicle.

Figure 4:
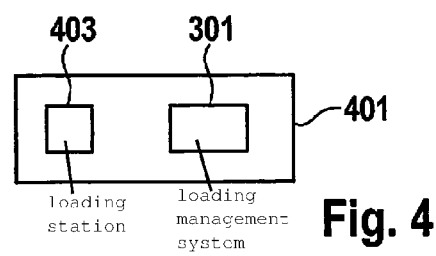
FIG. 4 shows a loading system.

FIG. 4 shows a loading system 401 for loading vehicles.
Loading system 401 comprises a loading station 403 and loading management system 301 from FIG. 3.

The present invention thus comprises in particular the idea of extending the principle of automatic parking in a parking facility to the loading of vehicles. Here, the present invention and, inter alia, a specific embodiment provide for the vehicle to drive autonomously from the loading station to the transport vehicle or to drive autonomously from the transport vehicle to the loading station. When the vehicle has reached an assigned destination position on the transport vehicle or, respectively, on the loading station, then the specific embodiment provides for the vehicle to park autonomously at the destination position.

A loading management system is provided in particular for coordinating and/or organizing the loading. A loading management system is provided for example, which is associated with the transport vehicle. For example, two loading management systems are provided, one being assigned to the loading point or loading station and the other being assigned to a destination loading point or a destination loading station, to which a vehicle is to be transported.

The loading management systems in particular each have an electronic memory, in which a digital map of the respective loading station is stored. According to one specific embodiment, however, such a digital map may also be transmitted to the loading management system. That is to say that a loading management system of the transport vehicle is provided for example with data (data of the loading point or loading station, start and/or destination positions of the vehicles). One specific embodiment for example provides, in the case of two loading management systems, for the loading management systems to be provided with the data of the transport vehicle (digital transport vehicle map) as well as with the positions (current and destination positions) and data of the vehicles that are to be transported.

For the purpose of loading logistics, that is, of autonomous loading, the loading management system(s) must take on a suitable coordination of the sequence of the autonomous vehicles to be driven. According to one specific embodiment, at least the following must be taken into account in the sequence:
dimensions of the vehicles,
dimensions of the transport vehicle with respect to driving routes and parking spaces for the vehicles and/or
possibilities regarding the range of driving maneuvers the autonomous vehicle is able to drive in the autonomous mode.

One specific embodiment provides for the digital maps of the loading station and of the transport vehicle to be combined into a common digital map. This occurs in particular at the start of the transport and at an end of the transport.

One specific embodiment provides that for the maps and/or the trajectories that the vehicles are supposed to drive the fact is to be taken into account that these are spatially shifted (a digital map of a ship with respect to coordinates is different for example in the Hamburg harbor than in New York). That is to say that the respective coordinates of the locations of the digital map are adapted.

According to one specific embodiment, the process, that is, in particular the autonomous drive, that is, in particular the loading, is monitored and/or documented by a monitoring system that is external to the vehicle and/or internal to the vehicle.

One specific embodiment provides for the data internal to the vehicle also to be monitored and/or documented.

One specific embodiment provides for a route from a loading station or loading point to the transport vehicle or vice versa to be additionally secured so that this route is as much as possible free of human beings so as advantageously to avoid a risk of collision.

What is claimed is:

1. A method for loading a vehicle, the method comprising:
   detecting at least one of: (a) dimensions of the vehicle and/or a transport vehicle; (b) a functional range of at least one driver assistance system of the vehicle; and (c) a range of driving maneuvers the vehicle is able to perform in an autonomous operating mode;
   ascertaining a rank in a loading sequence of the vehicle, the rank prescribing a sequence of loading vehicles, the rank being ascertained as a function of at least one of the following parameters: the dimensions of the vehicle, the functional range of at least one driver assistance system of the vehicle, the range of driving maneuvers the vehicle is able to perform in the autonomous operating mode, dimensions of the transport vehicle, dimensions of the transport vehicle with respect to one or more driving routes and/or parking spaces for the vehicles, dimensions of a loading station, and dimensions of the loading station with respect to one or more driving routes and/or parking spaces for the vehicles; and
   autonomously driving, by the vehicle, one of: i) from a loading station onto a transport vehicle, or ii) from the transport vehicle to the loading station, the autonomous driving being on the basis of a digital loading station map of the loading station and a digital transport vehicle map of the transport vehicle.

2. The method as recited in claim 1, wherein a destination position on the transport vehicle or on the loading station, at which the vehicle is to park autonomously, is chosen as a function of at least one vehicle parameter.

3. The method as recited in claim 2, wherein the at least one vehicle parameter is an element selected from one of the following vehicle parameters: the dimensions of the vehicle, the functional range of at least one driver assistance system of the vehicle, and the range of the driving maneuvers the vehicle is able to perform in the autonomous operating mode.

4. The method as recited in claim 1, wherein the autonomous drive of the vehicle is at least one of monitored and documented by a monitoring system, the monitoring system being at least one of external to the vehicle and internal to the vehicle.

5. The method as recited in claim 4, wherein the monitoring by the monitoring system that is internal to the vehicle includes at least one of a monitoring and documenting of data internal to the vehicle, the data including planning data concerning a planning of one or more trajectories, controller data, and controller result data concerning a controller result.

6. The method as recited in claim 1, wherein a route, which the vehicle drives during the autonomous driving, is secured.

7. The method as recited in claim 1, wherein the autonomous drive of the vehicle is at least one of planned, coordinated, and supported, by one or multiple loading management systems external to the vehicle for managing and coordinating the loading of vehicles.

8. The method as recited in claim 1, wherein the digital loading station map and the digital transport vehicle map form one aggregate digital overall map so that the vehicle drives autonomously from the transport vehicle to the loading station or from the loading station to the transport vehicle, based on the digital aggregate map.

9. The method as recited in claim 1, wherein coordinates of locations of the digital transport vehicle map are adapted as a function of a current position of the transport vehicle relative to a reference coordinate system to coordinates of the reference coordinate system.

10. The method as recited in claim 9, wherein the reference coordinate system includes the world coordinate system.

11. A loading management system for managing and coordinating loading of vehicles, comprising:
    a loading management device configured to perform the following:
    performing at least one of: (a) detecting dimensions of the vehicle and/or a transport vehicle; (b) detecting a functional range detecting arrangement to detect a functional range of at least one driver assistance system of the vehicle; and (c) detecting the range of driving maneuvers the vehicle is able to perform in an autonomous operating mode;
    ascertaining a rank in a loading sequence of the vehicle, the rank prescribing a sequence of loading vehicles, the rank being ascertained as a function of at least one of the following parameters: the dimensions of the vehicle, the functional range of at least one driver assistance system of the vehicle, the range of driving maneuvers the vehicle is able to perform in the autonomous operating mode, dimensions of the transport vehicle, dimensions of the transport vehicle with respect to one or more driving routes and/or parking spaces for the vehicles, dimensions of a loading station, and dimensions of the loading station with respect to one or more driving routes and/or parking spaces for the vehicles; and
    at least one of plan, coordinate, and support, an autonomous drive of a vehicle one of: i) from the transport vehicle to the loading station, or ii) from the loading station to the transport vehicle.

12. A loading system for loading vehicles, comprising:
    a loading station; and
    a loading management device configured to perform the following:
    performing at least one of: (a) detecting dimensions of the vehicle and/or a transport vehicle; (b) detecting a functional range detecting arrangement to detect a functional range of at least one driver assistance system of the vehicle; and (c) detecting the range of driving maneuvers the vehicle is able to perform in an autonomous operating mode;
    ascertaining a rank in a loading sequence of the vehicle, the rank prescribing a sequence of loading vehicles, the rank being ascertained as a function of at least one of the following parameters: the dimensions of the vehicle, the functional range of at least one driver assistance system of the vehicle, the range of driving maneuvers the vehicle is able to perform in the autonomous operating mode, dimensions of the transport vehicle, dimensions of the transport vehicle with respect to one or more driving routes and/or parking spaces for the vehicles, dimensions of a loading station, and dimensions of the loading station with respect to one or more driving routes and/or parking spaces for the vehicles; and at least one of plan, coordinate, and support, an autonomous drive of a vehicle one of: i) from the transport vehicle to the loading station, or ii) from the loading station to the transport vehicle.

13. A non-transitory computer readable storage medium, on which is stored a computer program, which is executable by a processor, comprising:

a program code arrangement having program code for loading a vehicle, by performing the following:
detecting at least one of: (a) dimensions of the vehicle and/or a transport vehicle; (b) a functional range of at least one driver assistance system of the vehicle; and (c) a range of driving maneuvers the vehicle is able to perform in an autonomous operating mode:
ascertaining a rank in a loading sequence of the vehicle, the rank prescribing a sequence of loading vehicles, the rank being ascertained as a function of at least one of the following parameters: the dimensions of the vehicle, the functional range of at least one driver assistance system of the vehicle, the range of driving maneuvers the vehicle is able to perform in the autonomous operating mode, dimensions of the transport vehicle, dimensions of the transport vehicle with respect to one or more driving routes and/or parking spaces for the vehicles, dimensions of a loading station, and dimensions of the loading station with respect to one or more driving routes and/or parking spaces for the vehicles; and
autonomously driving, by the vehicle, one of: i) from a loading station onto a transport vehicle, or ii) from the transport vehicle to the loading station, the autonomous driving being on the basis of a digital loading station map of the loading station and a digital transport vehicle map of the transport vehicle.

* * * * *